United States Patent [19]

Susliaev et al.

[11] Patent Number: 5,757,093
[45] Date of Patent: May 26, 1998

[54] ELECTROMAGNETICALLY POWERED ENGINE

[76] Inventors: Konstantin Susliaev; Alexey Susliaev; Sergey Susliaev, all of 2862 S. Main St., Harrisonburg, Va. 22801

[21] Appl. No.: 816,515

[22] Filed: Mar. 13, 1997

[51] Int. Cl.$^6$ .................................... H02K 33/00
[52] U.S. Cl. ................................. 310/24; 310/35
[58] Field of Search .......................... 310/23, 24, 30, 310/34, 35, 80, 17

[56] References Cited

U.S. PATENT DOCUMENTS 4,507,579  3/1985  Turner ........................... 310/23
4,631,455  12/1986  Taishoff ......................... 318/37

*Primary Examiner*—Steven L. Stephan
*Assistant Examiner*—Judson H. Jones

[57] ABSTRACT

A new electromagnetically powered engine for powering vehicles and other devices which utilize an engine. The inventive device includes a plurality of pistons made of a ferromagnetic material disposed for reciprocation within insulative cylinders. A conductive coil is disposed around each of the cylinders for actuating the pistons when electricity is supplied to the coils. The pistons are connected with a crankshaft for converting reciprocating motion of the pistons into rotational motion of the crankshaft which is then utilized to power the vehicle or other device. The electricity is distributed to the coils in sequential fashion by a conventional distribution system.

10 Claims, 2 Drawing Sheets

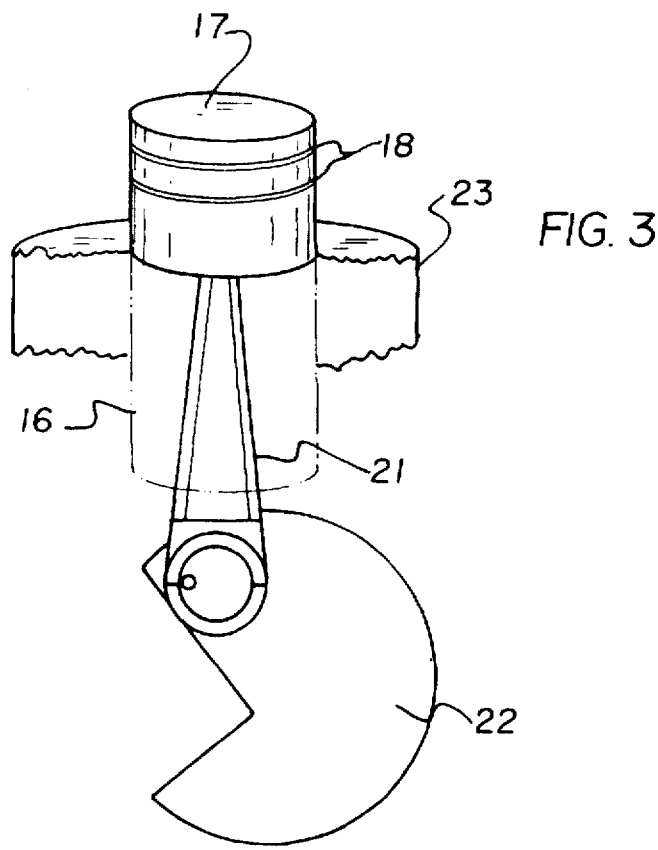
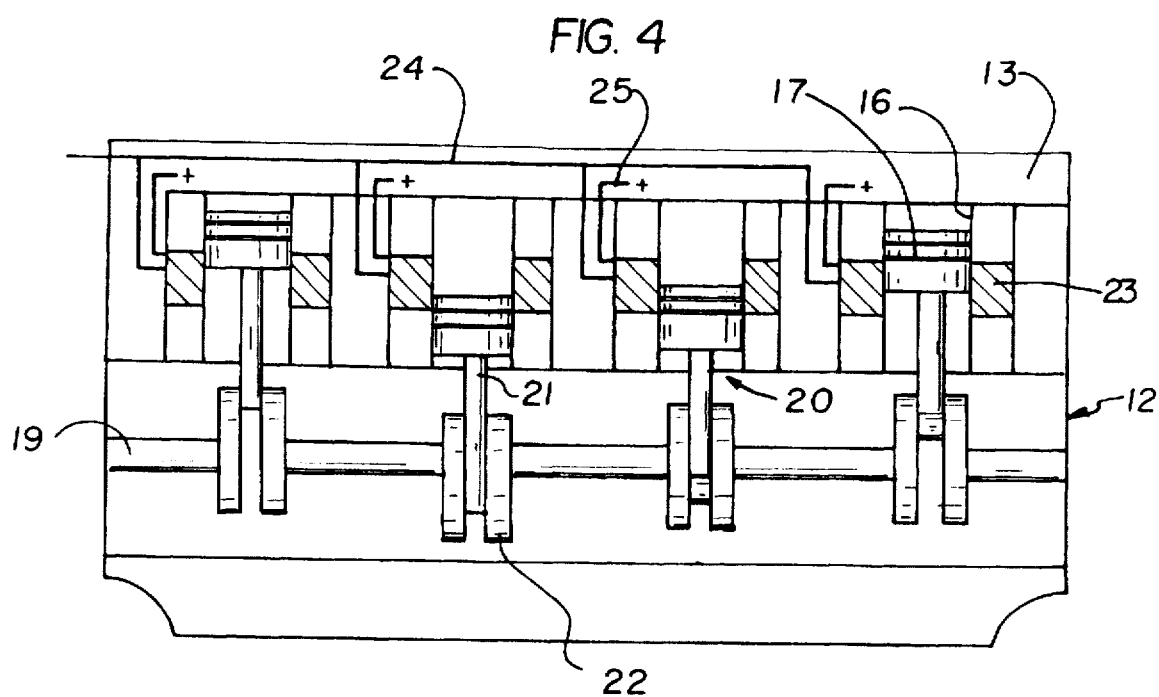

ELECTROMAGNETICALLY POWERED ENGINE

BACKGROUND OF THE INVENTION

1. Field of the Invention

The present invention relates to electromagnetically powered engines and more particularly pertains to a new electromagnetically powered engine for powering vehicles and other devices which utilize an engine.

2. Description of the Prior Art

The use of electromagnetically powered engines is known in the prior art. More specifically, electromagnetically powered engines heretofore devised and utilized are known to consist basically of familiar, expected and obvious structural configurations, notwithstanding the myriad of designs encompassed by the crowded prior art which have been developed for the fulfillment of countless objectives and requirements.

Known prior art electromagnetically powered engines include U.S. Pat. No. 5,219,034; U.S. Pat. No. 5,036,930; and U.S. Pat. No. 5,197,279. In addition, electric motors for driving vehicles and other devices are known from U.S. Pat. No. 4,663,937; U.S. Pat. No. 4,325,451; and U.S. Pat. No. 4,584,513.

While these devices fulfill their respective, particular objectives and requirements, the aforementioned patents do not disclose a new electromagnetically powered engine. The inventive device includes a plurality of pistons made of a ferromagnetic material disposed for reciprocation within insulative cylinders. A conductive coil is disposed around each of the cylinders for actuating the pistons when electricity is supplied to the coils. The pistons are connected with a crankshaft for converting reciprocating motion of the pistons into rotational motion of the crankshaft which is then utilized to power the vehicle or other device. The electricity is distributed to the coils in sequential fashion by a conventional distribution system.

In these respects, the electromagnetically powered engine according to the present invention substantially departs from the conventional concepts and designs of the prior art, and in so doing provides an apparatus primarily developed for the purpose of powering vehicles and other devices which utilize an engine.

SUMMARY OF THE INVENTION

In view of the foregoing disadvantages inherent in the known types of electromagnetically powered engines now present in the prior art, the present invention provides a new electromagnetically powered engine construction wherein the same can be utilized for powering vehicles and other devices which utilize an engine.

The general purpose of the present invention, which will be described subsequently in greater detail, is to provide a new electromagnetically powered engine apparatus and method which has many of the advantages of the electromagnetically powered engines mentioned heretofore and many novel features that result in a new electromagnetically powered engine which is not anticipated, rendered obvious, suggested, or even implied by any of the prior art electromagnetically powered engines, either alone or in any combination thereof.

To attain this, the present invention generally comprises a plurality of pistons made of a ferromagnetic material disposed for reciprocation within insulative cylinders. A conductive coil is disposed around each of the cylinders for actuating the pistons when electricity is supplied to the coils. The pistons are connected with a crankshaft for converting reciprocating motion of the pistons into rotational motion of the crankshaft which is then utilized to power the vehicle or other device. The electricity is distributed to the coils in sequential fashion by a conventional distribution system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electromagnetically powered engine apparatus and method which has many of the advantages of the electromagnetically powered engines mentioned heretofore and many novel features that result in a new electromagnetically powered engine which is not anticipated, rendered obvious, suggested, or even implied by any of the prior art electromagnetically powered engines, either alone or in any combination thereof.

It is another object of the present invention to provide a new electromagnetically powered engine which may be easily and efficiently manufactured and marketed.

It is a further object of the present invention to provide a new electromagnetically powered engine which is of a durable and reliable construction.

An even further object of the present invention is to provide a new electromagnetically powered engine which is susceptible of a low cost of manufacture with regard to both materials and labor, and which accordingly is then susceptible of low prices of sale to the consuming public, thereby making such electromagnetically powered engine economically available to the buying public.

Still yet another object of the present invention is to provide a new electromagnetically powered engine which provides in the apparatuses and methods of the prior art some of the advantages thereof, while simultaneously overcoming some of the disadvantages normally associated therewith.

Still another object of the present invention is to provide a new electromagnetically powered engine for powering vehicles and other devices which utilize an engine.

Yet another object of the present invention is to provide a new electromagnetically powered engine which includes a plurality of pistons made of a ferromagnetic material disposed for reciprocation within insulative cylinders. A conductive coil is disposed around each of the cylinders for actuating the pistons when electricity is supplied to the coils. The pistons are connected with a crankshaft for converting reciprocating motion of the pistons into rotational motion of the crankshaft which is then utilized to power the vehicle or other device. The electricity is distributed to the coils in sequential fashion by a conventional distribution system.

Still yet another object of the present invention is to provide a new electromagnetically powered engine that reduces air pollution by replacing conventional combustion engines.

Even still another object of the present invention is to provide a new electromagnetically powered engine that has a lower weight compared to conventional combustion engines.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a detailed view of one piston, cylinder, and coil arrangement.

FIG. 4 is a side view of the pistons and cylinders connected to the crankshaft, with only the outline of the engine block shown for clarity.

DESCRIPTION OF THE PREFERRED EMBODIMENT

Figure 1:
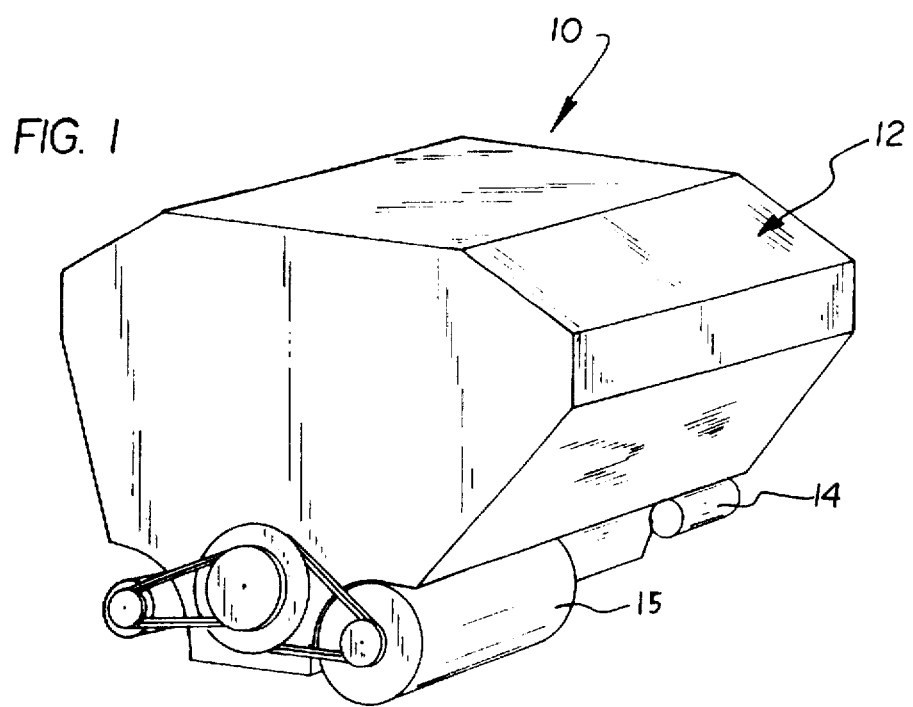
FIG. 1 is a perspective view of a new electromagnetically powered engine according to the present invention.

With reference now to the drawings, and in particular to FIGS. 1 through 4 thereof, a new electromagnetically powered engine embodying the principles and concepts of the present invention and generally designated by the reference numeral 10 will be described.

The engine 10 illustrated in FIGS. 1-4 is shown as being configured similarly to a conventional internal combustion engine, and is one suitable configuration for use with vehicles, such as automobiles. However, it should be realized that many different shapes and configurations of the elements herein are possible within the scope of the invention. In addition, although the invention is shown and described in regard to an automobile configuration, the engine could also be configured for use with trucks, boats, airplanes, pumps, and other devices which utilize an engine for power.

As best illustrated in FIGS. 1 through 4, the electromagnetically powered engine 10 comprises an engine block 12 made from an insulative material which does not conduct electricity. For instance, a glass fiber reinforced composite material, or other suitable material, would work well. The engine block includes an engine head 13 removably fastened thereto at the top by any suitable means, as shown in FIG. 4. The engine head 13 is removable so as to permit access to the interior of the block 12.

The engine 10 also includes a starter 14 and an alternator 15 associated therewith. The starter and alternator are similar to the starter and alternator found on conventional internal combustion engines, and perform a similar function which will be later explained. Electrical power for the engine is supplied by a battery or batteries on the vehicle.

The engine block 12 includes a plurality of cylinders 16 formed therein which are made of an insulative or non-conductive material and which does not block magnetic flux lines, such as plastic or glass fiber reinforced composite materials. Since no combustion is occurring within the cylinder, the cylinder wall can be made relatively thin since it does not have to withstand forces associated with combustion. Preferably, the wall thickness is about 5 mm or less which provides a significant weight reduction compared with cylinders used on conventional combustion engines, but which is able to withstand operational forces. The cylinders 16 can include breather ducts which allow air to escape from the cylinder chamber, thus preventing pressure build ups and/or creation of a vacuum within the cylinders. Such breather ducts can be similar to those found in U.S. Pat. No. 5,219,034, which is hereby incorporated by reference.

Pistons 17 are disposed for reciprocation within the cylinders 16. The pistons are made from a ferromagnetic material and can be the same size as the pistons found in conventional combustion engines. The piston diameters are made slightly smaller than the internal diameters of the cylinders to accommodate piston rings 18 on the surface of the pistons.

Figure 2:
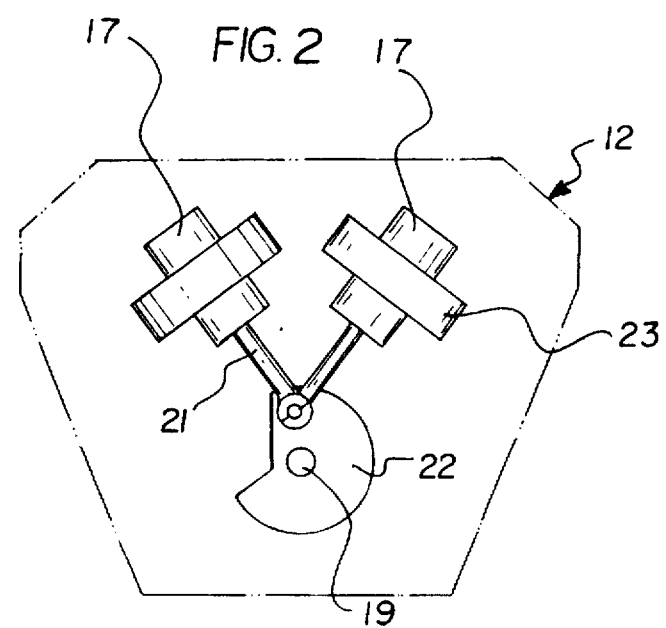
FIG. 2 is an end view illustrating the interior of the engine with the engine housing shown in broken lines for clarity, showing one possible arrangement of the pistons and cylinders.

Crankshaft 19 is rotationally supported within the engine block 12 by any suitable means known to a person having ordinary skill in the art. The crankshaft 19 outputs the power produced by the engine 10 for utilization as a driving force for the device on which the engine is mounted. The crankshaft 19 is linked to the pistons by linkage means 20. The linkage means 20 comprises piston rods 21 connected at one end to the pistons 17 and connected at their other ends to cranks 22 attached to the crankshaft 19. As best seen in FIGS. 2 and 3, the piston rods 21 are eccentrically connected to the cranks 22, such that reciprocating motion of the pistons 17 is converted to rotary motion of the crankshaft 19. This type of linkage between pistons and crankshafts is conventional and therefore no further explanation is considered necessary. The piston rods are formed from an insulative material, similar to the cylinder 16 and engine head 13.

In order to cause reciprocation of the pistons 17, a conductive coil 23 is wound around each cylinder 16. The coil 23 is wound from a wire which conducts electricity with a low resistance, such as the type of wire used in transformers. Copper wire has been found to be particularly useful.

The gauge of the wire depends upon the amount of power to be put through it, which will be appropriately selected by the user. As is known to persons having ordinary skill, the number of turns of the wire around the cylinder is directly proportional to the amount of electrical power fed to the coil, and the higher the number of turns, the higher the mechanical power output on the crankshaft. As should be apparent, when electricity is supplied to one of the coils, a strong magnetic field is produced which forces the piston downward in the cylinder. This downward movement is converted into rotation of the crankshaft 19 through the linkage means 20.

Electrical power is supplied to the coils 23 in a sequential or distributed manner, such that the coils are not energized at the same time, similar to the spark plug/distributor system on a combustion engine, to drive the crankshaft in a smooth and continuous manner. FIG. 4 illustrates each coil connected to a common or negative wire 24, with a further positive wire 25 leading from each coil to a distributor unit (not shown) located on or adjacent the engine 10. Preferably, an electronic distributor is used due to its higher switching speeds, although it has been found that a mechanical distributor works satisfactorily. Such distribution systems are generally known in the art and need not be further described. The engine is preferably controlled by an ignition key (not shown) which when turned on turns the starter 14, which turns the alternator 15. The alternator 15 feeds power to a transformer (not shown) which in turn feeds into a bridge rectifier/regulator (not shown). From there, power goes through a variable resistor (not shown) which is controlled by an accelerator pedal of the vehicle (not shown), and into the distributor unit. The vehicle battery/batteries supplies electrical power for starting the engine. Reference is again made to U.S. Pat. No. 5,219,034 which discloses a similar type of electrical control and distribution system in a electromagnetic engine, the entire disclosure of which has been previously incorporated by reference.

FIG. 2 illustrates the pistons arranged in a V-type of configuration, though other configurations such as in-line pistons, can be used. In addition, although the engine is shown as being a four cylinder engine, any number of cylinders can be utilized.

Operation of the engine is as follows: The ignition key is turned on, which turns the starter, which then turns the alternator. The power from the alternator is eventually fed into the distributor, through the variable resistor which is controlled by the accelerator pedal. Thus, the pedal, similar to a conventional engine, is used to control the engine output. From the distributor, the power is fed in sequence to the coils, which produce a strong magnetic field in the cylinders which push the pistons downward. This movement of the pistons is converted into rotational motion of the crankshaft, which is then used to drive the vehicle of other device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electromagnetically powered engine, comprising:
   a plurality of pistons disposed for reciprocation within a corresponding plurality of cylinders, said pistons being formed of a ferromagnetic material and said cylinders being formed of a nonconductive material;
   a conductive coil disposed around each of said cylinders for actuating said pistons in said cylinders when electricity is supplied to the coils;
   a crankshaft mounted for rotation within the engine, the crankshaft being for supplying output power from the engine;
   a linkage means connected between each of said pistons and said crankshaft for transforming reciprocating motion of said pistons into rotational motion of the crankshaft; and
   an alternator being adapted for providing power to the coils.

2. The electromagnetically powered engine of claim 1, wherein said ferromagnetic material comprises iron.

3. The electromagnetically powered engine of claim 1, wherein said non-conductive material comprises a plastic material.

4. The electromagnetically powered engine of claim 1, wherein said non-conductive material comprises a glass fiber reinforced composite material.

5. The electromagnetically powered engine of claim 1, wherein said conductive coil comprises a plurality of turns of a copper wire.

6. The electromagnetically powered engine of claim 1, wherein each said linkage means comprises a piston rod connected at one of its ends to the piston and connected eccentrically at its end opposite said one end to the crankshaft.

7. The electromagnetically powered engine of claim 6, wherein each said piston rod is formed of an insulating material.

8. The electromagnetically powered engine of claim 1, wherein said pistons and said cylinders are disposed within an engine block, said engine block including an engine head attached thereto such that said engine head covers the pistons and the cylinders, said engine head being formed of an insulating material.

9. The electromagnetically powered engine of claim 8, wherein said insulating material comprises a glass fiber reinforced composite material.

10. An electromagnetically powered engines comprising:
    a plurality of pistons disposed for reciprocation within a corresponding plurality of cylinders, said pistons being formed of iron and said cylinders being formed of one non-conductive material chosen from the group of non-conductive materials consisting of plastic and glass fiber reinforced composite;

a copper conductive coil disposed around each of said cylinders for actuating said pistons in said cylinders when electricity is supplied to the coil;

a crankshaft mounted for rotation within the engine for supplying output power therefrom;

a linkage means connected between each of said pistons and said crankshaft for transforming reciprocating motion of said pistons into rotational motion of the crankshaft;

an alternator being adapted for providing power to the coils;

a number of piston rods, each piston rod formed from an electrically insulating material, each of the piston rods connected at a first end to a respective one of said pistons, each of the piston rods connected eccentrically to the crankshaft at a second end of each of the piston rods, the second end of each of the piston rods being positioned opposite said first end of each of the respective piston rods; and wherein said pistons and said cylinders are disposed within ail engine block, said engine block including an engine head attached thereto such that said engine head covers the pistons and the cylinders, said engine head being formed of an insulating material.

\* \* \* \* \*